United States Patent
Yamamoto et al.

(10) Patent No.: US 10,766,367 B2
(45) Date of Patent: Sep. 8, 2020

(54) TRAIN CONTROL DEVICE

(71) Applicants: Kabushiki Kaisha Toshiba, Minato-ku (JP); Toshiba Infrastructure Systems & Solutions Corporation, Kawasaki-shi (JP)

(72) Inventors: Junko Yamamoto, Yokohama (JP); Hirotoshi Kawai, Setagaya (JP); Satoshi Iba, Hachioji (JP); Yohei Hattori, Koto (JP); Yasuyuki Miyajima, Kunitachi (JP)

(73) Assignees: Kabushiki Kaisha Toshiba, Minato-ku (JP); Toshiba Infrastructure Systems & Solutions Corporation, Kawasaki-shi (JP)

( * ) Notice: Subject to any disclaimer, the term of this patent is extended or adjusted under 35 U.S.C. 154(b) by 338 days.

(21) Appl. No.: 15/742,287

(22) PCT Filed: Jul. 8, 2016

(86) PCT No.: PCT/JP2016/070316
§ 371 (c)(1),
(2) Date: Jan. 5, 2018

(87) PCT Pub. No.: WO2017/007029
PCT Pub. Date: Jan. 12, 2017

(65) Prior Publication Data
US 2018/0215270 A1 Aug. 2, 2018

(30) Foreign Application Priority Data
Jul. 9, 2015 (JP) .................................. 2015-137886

(51) Int. Cl.
*B60L 3/00* (2019.01)
*B60L 15/20* (2006.01)

(52) U.S. Cl.
CPC ............... *B60L 3/0076* (2013.01); *B60L 3/00* (2013.01); *B60L 15/20* (2013.01); *B60L 2200/26* (2013.01); *Y02T 10/7275* (2013.01)

(58) Field of Classification Search
CPC .......... B60L 3/00; B60L 3/0076; B60L 15/20; B60L 2200/26
See application file for complete search history.

(56) References Cited

U.S. PATENT DOCUMENTS 9,642,163 B2 * 5/2017 Nagasaki ................ B60L 15/40
9,802,632 B2 * 10/2017 Voyer ..................... B61L 3/006
(Continued)

FOREIGN PATENT DOCUMENTS

| CN | 102029921 A | 4/2011 |
| CN | 104379396 A | 2/2015 |

(Continued)

OTHER PUBLICATIONS

International Search Report dated Sep. 20, 2016 in PCT/JP2016/070316 (with English translation), 6 pages.

*Primary Examiner* — Jason C Smith
(74) *Attorney, Agent, or Firm* — Oblon, McClelland, Maier & Neustadt, L.L.P.

(57) ABSTRACT

A train control device includes a train position detector, a storage, and an in-vehicle controller. The train position detector detects a traveling position of a train. The storage stores therein a traveling position of the train when a loss of contact of the current collector occurs, as a loss-of-contact position. When the train travels in a predetermined section including the loss-of-contact position with reference to the traveling position of the train and the storage, the in-vehicle controller causes the train to perform coasting traveling in the predetermined section.

2 Claims, 4 Drawing Sheets

(56) References Cited

U.S. PATENT DOCUMENTS

| | | | | |
|---|---|---|---|---|
| 10,457,307 | B2* | 10/2019 | Schultz | B61L 29/32 |
| 10,538,163 | B2* | 1/2020 | Nam | B60T 8/172 |
| 2013/0325224 | A1* | 12/2013 | Yamamoto | B61L 27/0016 |
| | | | | 701/20 |
| 2018/0215270 | A1* | 8/2018 | Yamamoto | B60L 3/00 |
| 2019/0241077 | A1* | 8/2019 | Gluck | B60L 3/0015 |
| 2019/0299786 | A1* | 10/2019 | Nakagawa | B60T 8/96 |
| 2019/0329655 | A1* | 10/2019 | Petrak | B60L 1/02 |

FOREIGN PATENT DOCUMENTS

| | | |
|---|---|---|
| JP | 2009-183088 A | 8/2009 |
| JP | 2010-35338 A | 2/2010 |
| JP | 2010-122102 A | 6/2010 |
| JP | 2011-78185 A | 4/2011 |
| JP | 2013-251953 A | 12/2013 |
| JP | 2014-103790 A | 6/2014 |
| JP | 2015-12728 A | 1/2015 |

* cited by examiner

TRAIN CONTROL DEVICE

CROSS-REFERENCE TO RELATED APPLICATIONS

This application is national stage application of International Application No. PCT/JP2016/070316, filed on Jul. 8, 2016, which designates the United States, incorporated herein by reference, and which claims the benefit of priority from Japanese Application No. 2015-137886, filed on Jul. 9, 2015, the entire contents of which are incorporated herein by reference.

FIELD

An embodiment described herein relates generally to a train control device.

BACKGROUND

A railroad vehicle includes a motor that drives the vehicle, and a vehicle control device that collects a current from an overhead contact line or a third rail to receive electric power, converts the electric power into required voltage and electric current, and supplies the required voltage and electric current to the motor.

In such a railroad vehicle, it is desired to prevent the occurrence of loss of contact in which a pantograph or a current collector shoe is separated from an overhead contact line or a third rail, thereby continuously supplying power to apparatuses such as the motor and in-vehicle electric equipment.

DETAILED DESCRIPTION

In general, a train control device according an embodiment includes a train position detector, a storage, and an in-vehicle controller. The train position detector detects a traveling position of a train. The storage stores therein a traveling position of the train when a loss of contact of the current collector occurs, as a loss-of-contact position. When the train travels in a predetermined section including the loss-of-contact position with reference to the traveling position of the train and the storage, the in-vehicle controller causes the train to perform coasting traveling in the predetermined section.

Next, with reference to drawings, an embodiment is explained in detail.

Figure 1:
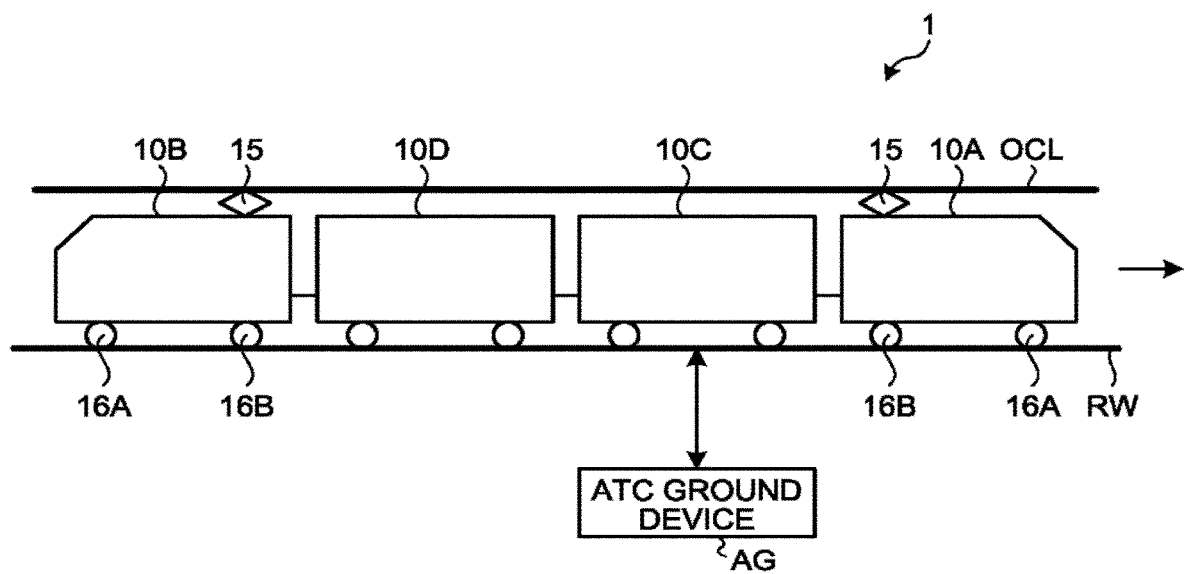
FIG. 1 is a schematic explanatory view of a train provided with a train control device according to an embodiment.

FIG. 1 is a schematic explanatory view of a train provided with a train control device according to the embodiment.

A train 1 is provided with vehicles 10A and 10B each of which is an electric locomotive, and vehicles 10C and 10D each of which is an electric railcar.

Each of the vehicle 10A and the vehicle 10B is provided with a pantograph 15 as a current collector, driven by electric power supplied from an overhead contact line OCL, and capable of traveling by wheels 16A and 16B on a railway RW that constitutes a track circuit while communicating with an ATC ground device AG.

Figure 2:
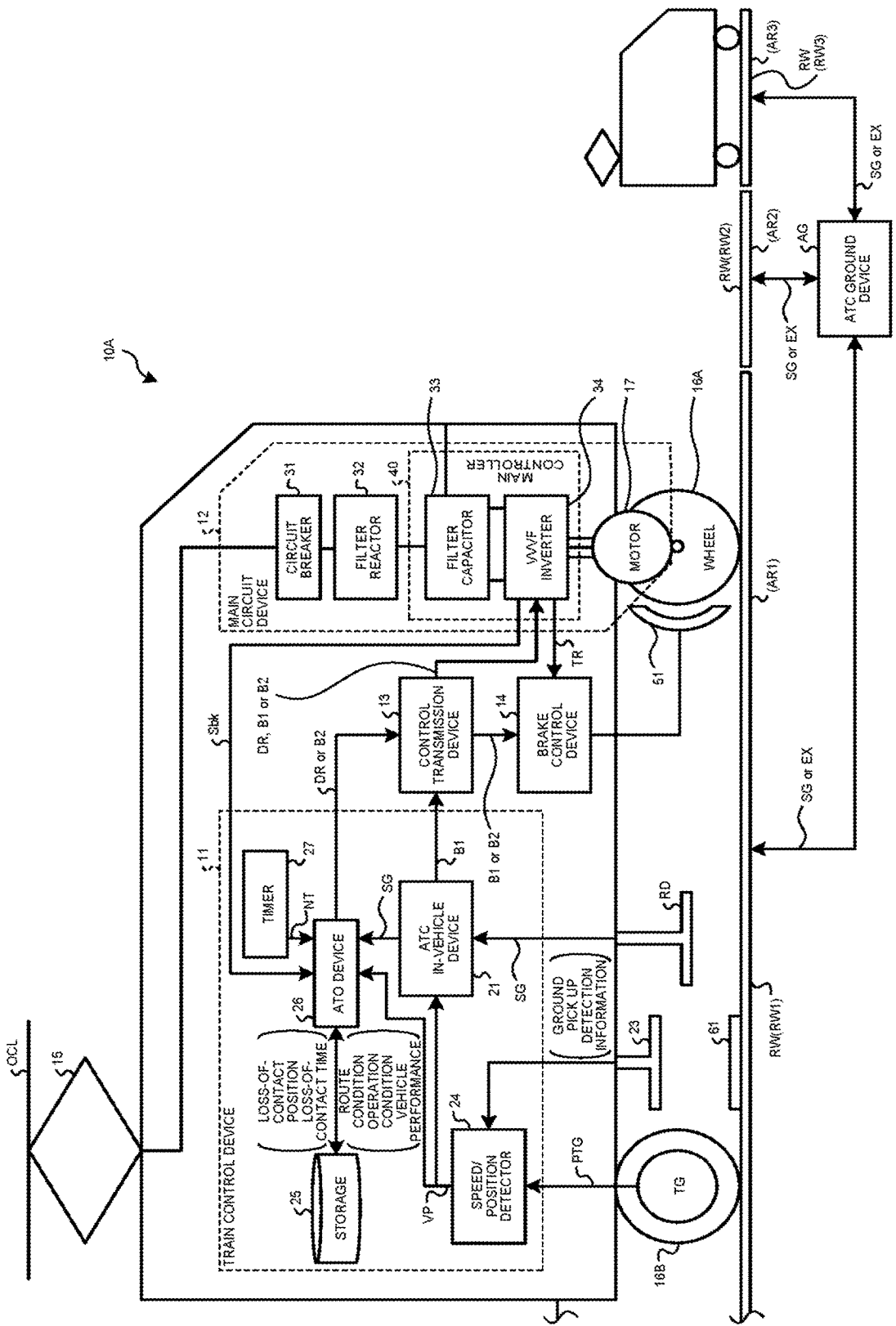
FIG. 2 is a schematic configuration block diagram of a train control system provided with the train control device according to the embodiment.

FIG. 2 is a schematic configuration block diagram of a train control system provided with the train control device according to the embodiment.

In FIG. 2, for the sake of brevity, the explanation is made by taking the vehicle 10A as an example.

The vehicle 10A is, as illustrated in FIG. 2, roughly includes a train control device 11, a main circuit device 12, a control transmission device 13, a brake control device 14, a pantograph 15 as a current collector, wheels 16A and 16B, and a motor 17.

The train control device 11 is provided with an ATC in-vehicle device 21 that outputs a first brake command B1 for controlling (deceleration-controlling) the speed of a train to a limiting speed or lower in cooperation with the ATC ground device AG, and a speed/position detector 24 that detects a speed based on a TG pulse from a tachometer generator (TG) 22 and, at the same time, detects the traveling position of the train in cooperation with a position detection-use in-vehicle pick up 23 and a position detection-use ground pick up 61 to output speed/position detection information VP.

Furthermore, the train control device 11 is provided with a storage 25 that stores route conditions, operation conditions, vehicle performances, and a position and a time when the pantograph 15 separates from the overhead contact line OCL; an ATO device 26 that outputs a power running command DR and a second brake command B2 in order to perform operation control of the vehicle 10 based on memory information in the storage 25, and a signal indication (information) SG received from the ATC in-vehicle device 21 via the railway RP and a power receiver RD; and a timer 27 that has a real time clock (RTC) function, and clocks a current time to output the time as current time information NT.

The main circuit device 12 is provided with a circuit breaker 31 for interrupting electric power supplied from the overhead contact line via the pantograph; a filter reactor 32 for removing noises of the electric power supplied via the pantograph; a filter capacitor 33 for removing the noises in cooperation with the filter reactor 32 and, at the same time, smoothing the electric power supplied; and a VVVF inverter 34 that performs power conversion of the electric power supplied from the overhead contact line, or regenerative power from the motor based on the power running command DR, the first brake command B1, or the second brake command B2 and, at the same time, outputs an interruption detection signal Sbk when the electric power supplied from the overhead contact line OCL is interrupted. The main circuit device 12 controls the motor 17 based on the power running command DR and the brake commands B1, B2 that are output from the train control device 11.

In the above-mentioned constitution, the filter capacitor 33 and the VVVF inverter 34 constitute a main controller 40.

The control transmission device 13 transmits the power running command DR, the first brake command B1, or the second brake command B2 that are output from the train control device 11 to the main circuit device 12 or the brake control device 14.

The brake control device 14 controls a braking device 51, which is a mechanical brake, based on the first brake command B1 and the second brake command B2 that are transmitted via the control transmission device 13, and regeneration-torque generation amount information TR output from the VVVF inverter 34, thus decelerating and stopping the vehicle.

Next, the operation according to the embodiment is explained.

Figure 3:
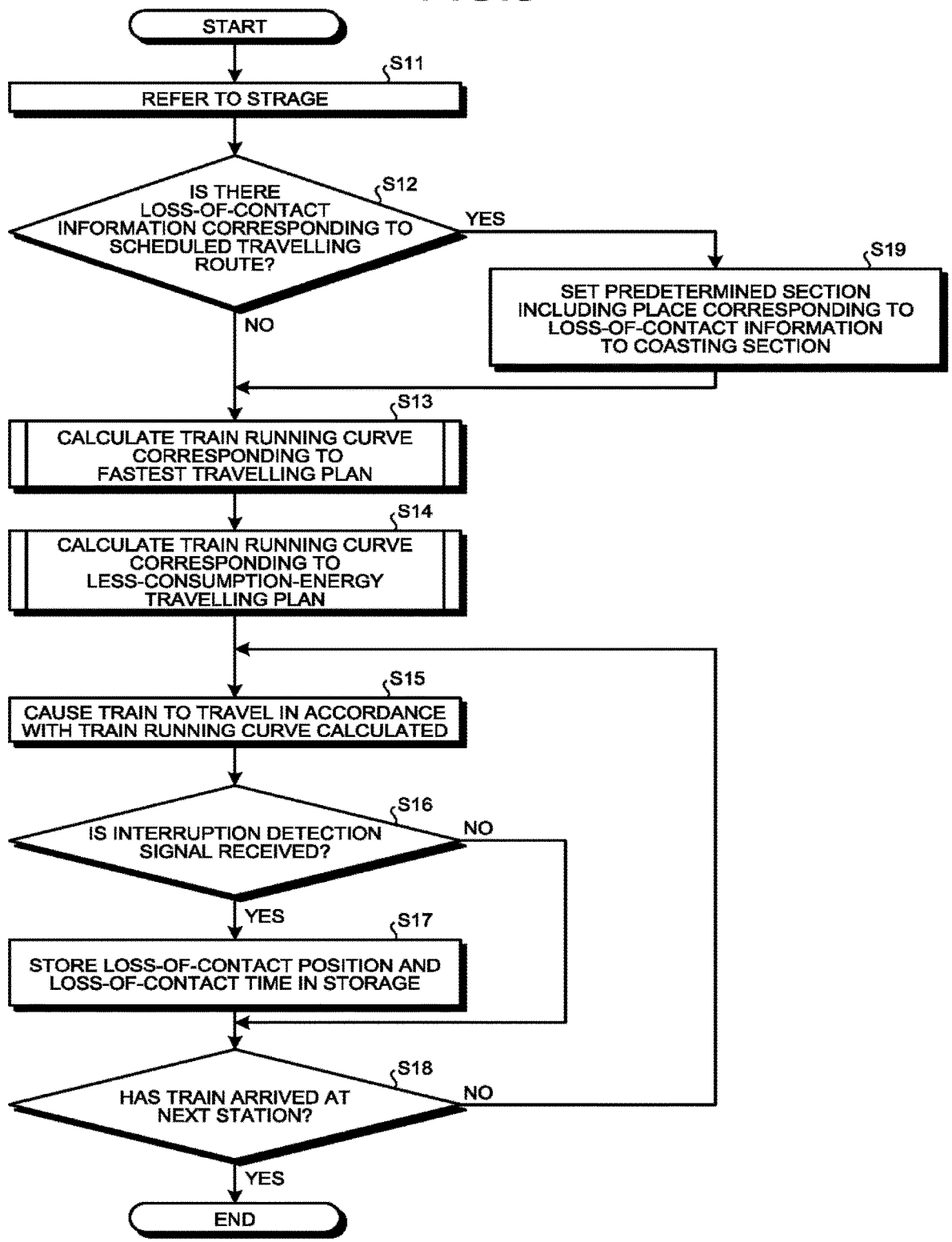
FIG. 3 is an operation flow chart according to the embodiment.

FIG. 3 is an operation flow chart of the train control system according to the embodiment.

Figure 4:
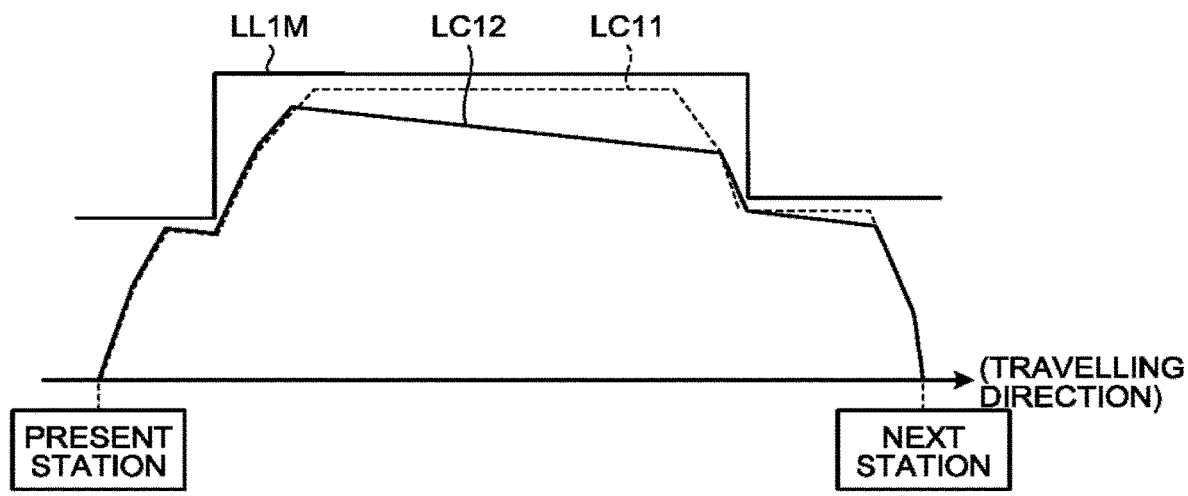
FIG. 4 is an explanatory view of a traveling plan calculation when there is no loss-of-contact information.

FIG. 4 is an explanatory view of a traveling plan calculation when there is no loss-of-contact information.

The ATO device 26 refers to the storage at a station departure time (step S11), and determines whether there is the loss-of-contact information corresponding to a scheduled traveling route (step S12).

[1] In the case where there is no loss-of-contact information corresponding to the scheduled traveling route In determination at step S12, when there is no loss-of-contact information corresponding to the scheduled traveling route (No at step S12), the ATO device 26 calculates a train running curve (traveling curve) corresponding to a traveling plan (referred to a "fastest traveling plan") in which a train arrives at the next station earliest when traveling at a speed equal to or lower than a limiting speed (limiting-speed curve LLIM) based on a speed and a position of the train 1 that corresponds to the speed/position detection information VP detected by and output from the speed/position detector 24, route information to the next station, operation information, and vehicle information that are read out from the storage 25, and the signal indication information received by the ATC in-vehicle device 21 (step S13). To be more specific, for example, the ATO device 26 calculates a train running curve LC11 corresponding to such a fastest traveling plan as indicated by a dashed line in FIG. 4.

Furthermore, the ATO device 26 substitutes coasting for constant-speed traveling and power running in respective parts of the train running curve LC11 corresponding to the fastest traveling plan, and calculates a train running curve corresponding to such a traveling plan that the train travels to the next station using as less consumption energy as possible and stops at a predetermined position in the next station at a predetermined time (step S14). To be more specific, for example, the ATO device 26 calculates a train running curve LC12 corresponding to such a traveling plan as indicated by a continuous line in FIG. 4.

Subsequently, the ATO device 26 outputs the power running command DR or the second brake command B2 to the main circuit device 12 and the braking device 51 via the control transmission device 13 based on the train running curve LC12 calculated, that is, based on the traveling plan thus causing the train to travel in accordance with the train running curve LC12 calculated (step S15).

In this case, the ATO device 26 may calculate and output the power running command DR and the second brake command B2 so that a train speed can be made to follow the traveling curve (train running curve) of the traveling plan. Furthermore, the ATO device 26 may output the power running command DR and the second brake command B2 that are specified in the traveling plan.

Furthermore, the ATO device 26 may calculate and output the power running command DR and the second brake command B2 that correspond to a travelling mode (power running mode, constant-speed mode, coasting mode, decelerating mode) in the traveling plan.

In addition, when a station departure time is earlier or later than a schedule or when a deviation from the traveling curve (train running curve) becomes larger than a threshold value set in advance in traveling or when the signal indication information SG received by the ATC in-vehicle device 21 is inconsistent with speed limit information read out from a storage unit, the ATO device 26 recalculates the traveling plan on the basis of a current position, a current speed, and a current time, and calculates the power running command and the brake command based on the latest traveling plan.

Meanwhile, when the loss of contact occurs while the train 1 is in power running, the electric charge of the filter capacitor 33 that constitutes the main controller in the main circuit device reduces, a voltage difference between the overhead contact line OCL and the filter capacitor 33 becomes large, an excessive electric current flows into the circuit breaker 31 in the case of the re-contact in which the pantograph 15 is brought into contact with the overhead contact line OCL again and hence, the circuit breaker 31 operates. Accordingly, the VVVF inverter 34 that constitutes the main controller 40 transmits the interruption detection signal Sbk to the ATO device 26 when the interruption operation of the circuit breaker 31 is detected.

Here, while causing the train travel in accordance with the traveling curve (train running curve), the ATO device 26 determines whether the interruption detection signal Sbk is received (step S16).

In determination at step S16, when the interruption detection signal Sbk is not received (No at step S16), the processing advances to step S18.

In determination at step S16, when the interruption detection signal Sbk is received, the ATO device 26 stores, as loss-of-contact detection information, a position at which the interruption detection signal is received (loss-of-contact position) and an occurrence time (loss-of-contact time) that are associated with each other, in the storage 25 (step S17).

In this case, any number of pieces of the loss-of-contact detection information can be stored depending on the storage capacity of the storage 25 and, for example, up to 100 pieces of the latest information may be stored.

Subsequently, the ATO device 26 determines whether e train has arrived at a next station that is a destination of traveling in accordance with the traveling plan calculated at a previous station (step S18).

In determination at step S18, when the train has not yet arrived at the next station (No at step S18), the processing advances to S15 again and thereafter, the processing is repeated in the same manner as above.

In determination at step S18, when the train has arrived at the next station (Yes at step S18), the processing is terminated. Here, when the next station at which the train has arrived is not a terminal station, the processing advances to S11 again to continue the processing.

Figure 5:
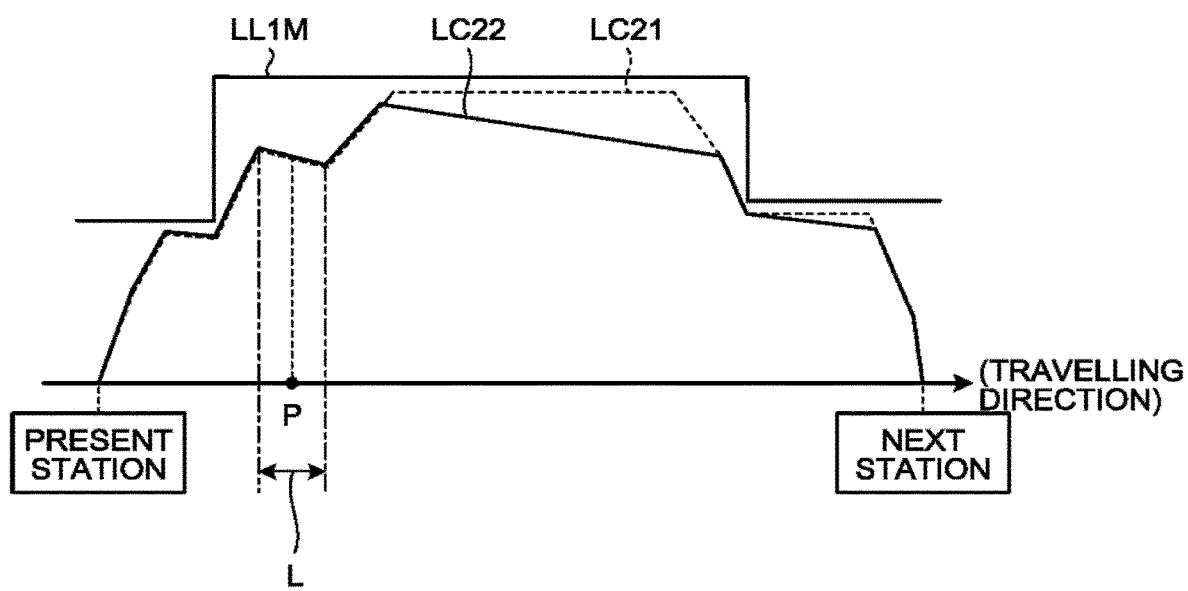
FIG. 5 is an explanatory view of a traveling plan calculation when there is loss-of-contact information.

[2] In the case where there is loss-of-contact information corresponding to the scheduled traveling route FIG. 5 is an explanatory view of a traveling plan calculation when there is loss-of-contact information.

In determination at step S12, when there is loss-of-contact information corresponding to the scheduled traveling route (Yes at step S12), the ATO device 26 sets a predetermined section including the loss-of-contact position corresponding to the loss-of-contact information to a coasting section (step S19), based on a speed and a position of the train 1 that correspond to the speed/position detection information VP that the speed/position detector 24 detects and outputs, the route information to the next station, the operation information, the vehicle information that are read out from the storage 25, the signal indication information SG received by the ATC in-vehicle device 21, and the loss-of-contact position corresponding to the loss-of-contact information. Furthermore, while setting the above-described coasting section, the ATO device 26 calculates the train running curve (traveling curve) corresponding to the fastest traveling plan (step S13).

To be more specific, for example, when a point P indicates the loss-of-contact position corresponding to the loss-of-contact information, the ATO device 26 calculates, as indicated by a dashed line in FIG. 5, a train running curve LC21 corresponding to the fastest traveling plan in which a predetermined section L including the point P is set to the coasting section.

In this case, to consider a case where the predetermined section L including the point P is set to the coasting section, when the train is incapable of arriving at the next station in a predetermined time, the ATO device 26 may adjust the section length (distance) of the predetermined section L to be shortened or may adjust a running speed to be increased.

When the length of the predetermined section L is shortened, for example, the ATO device 26 can also be configured so that one of the pantographs 15 of the train 1 can pass through the point P in a coasting state, and the other pantographs 15 can pass through the point P in a power running state.

Furthermore, the ATO device 26 substitutes coasting for constant-speed traveling and power running in respective parts of the train running curve LC21 corresponding to the fastest traveling plan, and calculates a train running curve corresponding to such a traveling plan that the train travels to the next station using as less consumption energy as possible and stops at a predetermined position in the next station at a predetermined time (step S14). To be more specific, for example, the ATO device 26 calculates a train running curve LC22 corresponding to such a traveling plan as indicated by a continuous line in FIG. 5.

Subsequently, the ATO device 26 outputs the power running command DR or the second brake command B2 to the main circuit device 12 and the braking device 51 via the control transmission device 13 based on the train running curve LC22 calculated, that is, based on the traveling plan thus causing the train to travel in accordance with the train running curve calculated (step S15).

In this case also, when a station departure time is earlier or later than a schedule or when a deviation from the train running curve becomes larger than a threshold value set in advance in traveling or when the signal indication information SG received by the ATC in-vehicle device 21 is inconsistent with speed limit information read out from the storage unit, the ATO device 26 recalculates the traveling plan on the basis of a current position, a current speed, and a current time, and calculates the power running command and the brake command based on the latest traveling plan.

In this case also, even when the train passes through the point P corresponding to the existing loss-of-contact position in coasting, there exists the possibility that another loss of contact is detected. Accordingly, the ATO device 26 determines whether the interruption detection signal Sbk is received (step S16) while the train is traveling in accordance with the train running curve.

In determination at step S16, when the interruption detection signal Sbk is not received (No at step S16), the processing advances to S18.

In determination at step S16, when the interruption detection signal Sbk is received, the ATO device 26 stores, as loss-of-contact detection information, a position at which the interruption detection signal is received (loss-of-contact position) and a loss-of-contact occurrence time (loss-of-contact time) that are associated with each other, in the storage 25 (step S17).

In this case also, for example, up to 100 pieces of the latest loss-of-contact detection information may be stored.

Subsequently, the ATO device 26 determines whether the train has arrived at a next station that is a destination of traveling in accordance with the traveling plan calculated at a previous station (step S18).

In determination at step S18, when the train has not yet arrived at the next station (No at step S18), the processing advances to S15 again and thereafter, the processing is repeated in the same manner as above.

In determination at step S18, when the train has arrived at the next station (Yes at step S18), the processing is terminated. Here, when the next station at which the train has arrived is not a terminal station, the processing advances to S11 again.

As explained above, according to the present embodiment, it is possible to prevent the deterioration of the riding comfortableness due to the discontinuation of power running or regenerative braking at a loss-of-contact occurrence place, and also prevent the damage to the overhead contact line or the third rail due to arc discharge.

The above explanation does not describe in detail the case where there are a plurality of points for each of which the loss-of-contact detection information is stored. In a case where there are a plurality of points (places) between stations, for each of the points the loss-of-contact detection information being stored, and the train performs coasting traveling in all of the certain sections including the points, when the train cannot travel in a predetermined travelling time between stations, a traveling plan is calculated so that the train can preferentially coast in a place with higher loss-of-contact occurrence frequency.

Accordingly, it is possible to prevent the discontinuation of the power running or the regenerative braking, and the arc discharge at a loss-of-contact occurrence place without delay.

In place of causing the train to travel by coasting at a loss-of-contact occurrence place, the train control device may make a traveling plan so that the train can travel with acceleration or deceleration within the allowable capacity of a motor other than the motor receiving power from the current collector passing through a loss-of-contact occurrence place, give a coasting command to the motor receiving power from the current collector passing through the loss-of-contact occurrence place in traveling, and give the power running command or the brake command to the motor receiving power from the current collector passing through another place. In the present application, as described above, even in a case the train as a whole does not actually coast, a case where the coasting command is given to the motor receiving power from the current collector passing through the loss-of-contact place effectually is also treated as being in coasting.

Accordingly, the train as a whole is prevented from coasting even when passing through the loss-of-contact occurrence place, and it is possible to prevent the increase in traveling time and, at the same time, it is possible to prevent the discontinuation of the power running or the regenerative braking, and the arc discharge at the loss-of-contact occurrence place.

Alternatively, the train control device can also be configured so that the train can perform the running, in place of the coasting, at a speed equal to or lower than a speed at which the loss of contact hardly occurs.

In addition, the ATO device may be configured so that a communication device (not illustrated in the drawings) can transmit the loss-of-contact detection information to a ground operation control center, the ground operation control center can collect the information and transmit the collected data to each train, and a traveling plan can be calculated with reference to the collected data in the train.

With such configuration, the train that has not yet traveled in a section including a place where the loss of contact is detected is capable of passing through the place in coasting from the beginning and, in the ground side too, it is possible to know promptly a place where railway maintenance operations are required.

Although the embodiments of the present invention have been explained, these embodiments are merely provided for an exemplifying purpose, and do not intend to limit the scope of the present invention. These novel embodiments can be carried out with other various configurations, and various abbreviations, substitutions, or modifications can be made without departing from the gist of the present invention. These embodiments and modifications thereof are embraced by the scope and the gist of the present invention, and are also embraced by the present invention described in claims and equivalents thereof.

The invention claimed is:

1. A train control device comprising:
   a train position detector that detects a traveling position of a train;
   a storage configured to store therein a traveling position of the train when a loss of contact of a current collector occurs, as a loss-of-contact position;
   an in-vehicle controller that causes, when the train travels in a predetermined section including the loss-of-contact position with reference to the traveling position of the train and the storage, the train to perform coasting traveling in the predetermined section; and
   a driving/braking controller that performs a driving and braking control of the train, and detects the loss of contact of the current collector, wherein
   the in-vehicle controller calculates a traveling plan to output a control command for controlling the driving/braking controller based on the traveling plan, and causes the storage to store therein the loss-of-contact position when the loss of contact of the current collector is detected by the driving/braking controller,
   the driving/braking controller includes an interruption detection unit that detects, via the current collector, an interruption of electric power supply from an overhead contact line, and
   the in-vehicle controller:
      makes a traveling plan for the train to accelerate or decelerate within an allowable capacity of a drive motor supplied with electric power from a current collector located at a contact position, with reference to the storage; and
      gives a coasting command to the chive motor supplied with electric power from the current collector located at the loss-of-contact position.

2. The train control device according to claim 1, further comprising:
   a communication unit that communicates with a ground control device, wherein
   the in-vehicle controller informs the ground control device of the detected loss-of-contact position,
   the ground control device stores the loss-of-contact position, collects data on the loss-of-contact position, and informs the in-vehicle controller of the collected data, and
   the in-vehicle controller performs control of the coasting traveling based on the collected data.

* * * * *